A. CANIS & F. HIGGINS.
Lubrication of Clutch Pulleys.
No. 136,699.        Patented March 11, 1873.
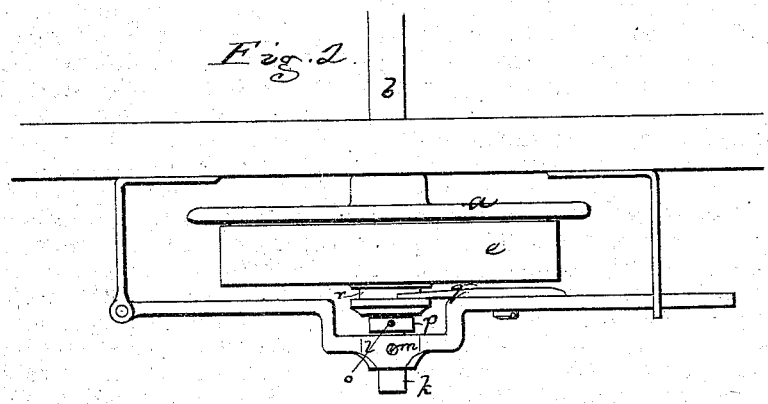
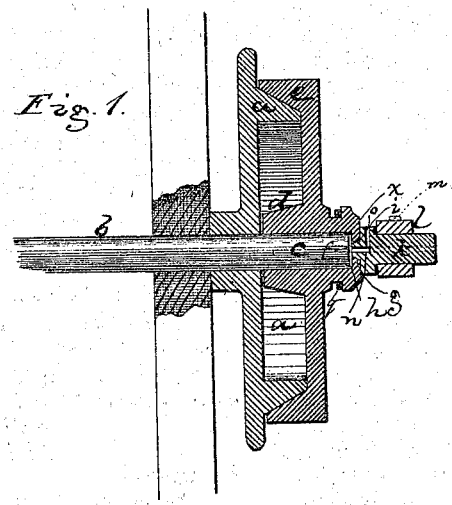

UNITED STATES PATENT OFFICE.

AUGUSTUS CANIS AND FREEMAN HIGGINS, OF MANCHESTER, N. H.

IMPROVEMENT IN THE LUBRICATION OF CLUTCH-PULLEYS.

Specification forming part of Letters Patent No. 136,699, dated March 11, 1873.

*To all whom it may concern:*

Be it known that we, AUGUSTUS CANIS and FREEMAN HIGGINS, both of Manchester, in the county of Hillsborough and State of New Hampshire, have invented an Improved Clutch-Pulley; and we do hereby declare that the following, taken in connection with the drawing which accompanies and forms part of this specification, is a description of our invention sufficient to enable those skilled in the art to practice it.

Our invention relates to the construction of a clutch or friction pulley with particular reference to provision for oiling. The invention is particularly intended for loom-pulleys, though useful for pulleys of other machines, it having been especially designed for loom-pulleys, in which it is particularly useful on account of its secretion or non-exposure of the oil. In the common construction the clutch or friction pulley is mounted upon an end extension of the shaft that carries the cone-pulley, the shaft extending through the clutch-pulley, and oil being applied to the shaft at the outer end of the hub of the clutch-pulley. In our invention the shaft is not extended through the hub of the friction-pulley, but between the end of the shaft and the end of the hub a small oil-chamber is formed or left, there being at the end of the chamber a flange or web having a central and tapering pivot and oil hole. Into this tapering pivot-hole extends a conical and tubular pivot, which is at the end of a pin that extends through the clutch-lever, this pivot projecting directly from a flange, into which extends a vertical oil-passage leading into the axial oil-hole bored through the pivot. Oil dropped into the vertical oil-hole passes into and through the conical pivot to and into the oil chamber, from which it will flow to, and only to, the end of the shaft upon which the friction-pulley runs, and to the bearing-surfaces of the pivot and pivot-socket. It is in this construction that our invention consists.

The drawing represents a pulley mechanism embodying our invention.

Figure 1 shows a sectional elevation of the mechanism. Fig. 2 is a plan of it.

$a$ denotes the cone-pulley fast upon the shaft $b$. $c$ denotes the end of the shaft beyond the pulley $a$, which shaft end extends into the hub $d$ of the clutch-pulley $e$. Beyond the end of the shaft the hub is made with the web $x$, having the central oil-hole $f$, terminating in a tapering socket, $g$, and between the web and the end of the shaft is left a small space, $h$, constituting an oil-chamber. Into the socket $g$ enters the conical pivot $i$ at the inner end of a pin, $k$, extending through the clutch-lever $l$, this pin being stationary and fastened by a screw, $m$. The pivot $i$ is made with an axial oil-passage, $n$, leading through the pivot and into the bottom of a vertical oil-passage, $o$, which extends from the other passage $n$ through a flange, $p$. The oil is poured into this passage $o$, and runs into and through the pivot to the chamber $h$, from which it runs to the surface of the shaft and of the pivot, only enough oil passing to the pivot to lubricate it. From the lever $l$ extends the fork $q$ that enters the groove $r$ of the hub of the clutch-pulley, and, when the lever is pressed in to engage the pulley and cone, the pivot $i$ is forced into the socket, and the friction comes upon the lubricated pivot, and not upon the fork.

By the arrangement of the oil-passages and the frictional surfaces as described, the outer surfaces of the pulley are always free from oil, and no oil can be thrown into contact with the work upon the loom or other machine with which the pulley is connected.

We claim—

The axial pin $k$ with its pivot $i$ and oil-passage $n$, and the clutch-pulley $e$ with its oil-chamber $h$, oil-hole $f$, and tapering socket $g$, the form and arrangement of the parts being substantially as shown and described.

AUGUSTUS CANIS.
FREEMAN HIGGINS.

Witnesses:
CHARLES BARRETT,
SYLVANUS B. PUTNAM.